US012243687B2

(12) United States Patent
Demcko

(10) Patent No.: US 12,243,687 B2
(45) Date of Patent: *Mar. 4, 2025

(54) COMPONENT ARRAY INCLUDING ONE OR MORE HEAT SINK LAYERS

(71) Applicant: KYOCERA AVX Components Corporation, Fountain Inn, SC (US)

(72) Inventor: Ronald S. Demcko, Raleigh, NC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,442

(22) Filed: May 25, 2023

(65) Prior Publication Data

US 2023/0298815 A1    Sep. 21, 2023

Related U.S. Application Data

(63) Continuation of application No. 17/228,810, filed on Apr. 13, 2021, now Pat. No. 11,664,159.

(Continued)

(51) Int. Cl.
   *H01G 2/08* (2006.01)
   *H01G 4/232* (2006.01)
   (Continued)

(52) U.S. Cl.
   CPC .............. *H01G 2/08* (2013.01); *H01G 4/232* (2013.01); *H01G 4/30* (2013.01); *H01G 4/38* (2013.01)

(58) Field of Classification Search
   None
   See application file for complete search history.

(56) References Cited

U.S. PATENT DOCUMENTS 4,734,819 A * 3/1988 Hernandez ............... H01G 4/30
                                                  361/306.2
5,956,226 A * 9/1999 Jung ....................... H01G 2/08
                                                  361/709

(Continued)

FOREIGN PATENT DOCUMENTS

| JP | H 08213278 A | 8/1996 |
| JP | H 11273984 A | 10/1999 |
| KR | 20160101699 A | 8/2016 |

OTHER PUBLICATIONS

International Search Report and Written Opinion for PCT/US2021/027052 dated Aug. 2, 2021, 8 pages.

*Primary Examiner* — Dion R. Ferguson
(74) *Attorney, Agent, or Firm* — Dority & Manning, P.A.

(57) ABSTRACT

A component array can include a first multilayer ceramic component having a first terminal at a first end and a second terminal at a second end opposite the first end in a first direction. A second component can have a first terminal at a first end and a second terminal at a second end opposite the first end in the first direction. A heat sink layer can be arranged between the first component and the second component in a second direction that is perpendicular to the first direction. The heat sink layer can include a first metallization layer electrically connecting the first terminal of the first multilayer ceramic component with the first terminal of the second multilayer ceramic component and a second metallization layer electrically connecting the second terminal of the first multilayer ceramic component with the second terminal of the second multilayer ceramic component.

22 Claims, 8 Drawing Sheets

Related U.S. Application Data

(60) Provisional application No. 63/009,579, filed on Apr. 14, 2020.

(51) Int. Cl.
  *H01G 4/30* (2006.01)
  *H01G 4/38* (2006.01)

(56) References Cited

U.S. PATENT DOCUMENTS

| | | | |
|---|---|---|---|
| 6,046,902 A * | 4/2000 | Nakagawa | H01G 4/232 |
| | | | 361/309 |
| 6,191,933 B1 * | 2/2001 | Ishigaki | H05K 3/3426 |
| | | | 361/309 |
| 7,023,688 B2 | 4/2006 | Kazama | |
| 9,491,847 B2 * | 11/2016 | Park | H05K 1/0306 |
| 9,818,540 B2 | 11/2017 | Saito | |
| 10,147,544 B1 | 12/2018 | Bultitude et al. | |
| 10,403,433 B2 * | 9/2019 | Choi | H01G 4/232 |
| 10,446,323 B1 * | 10/2019 | Son | H01G 4/30 |
| 10,466,323 B2 | 11/2019 | Lee et al. | |
| 10,468,195 B1 * | 11/2019 | Kim | H01G 4/38 |
| 10,748,711 B2 | 8/2020 | Konrad et al. | |
| 10,840,023 B2 | 11/2020 | Bultitude et al. | |
| 11,664,159 B2 * | 5/2023 | Demcko | H01G 4/30 |
| | | | 361/274.3 |
| 2011/0090665 A1 * | 4/2011 | Korony | H01C 7/006 |
| | | | 29/829 |
| 2016/0088735 A1 * | 3/2016 | Park | H05K 1/181 |
| | | | 361/782 |
| 2016/0205769 A1 * | 7/2016 | Park | H01L 23/642 |
| | | | 174/260 |
| 2020/0105472 A1 * | 4/2020 | Song | H01G 4/236 |
| 2021/0319951 A1 * | 10/2021 | Demcko | H01G 2/08 |
| 2023/0298815 A1 * | 9/2023 | Demcko | H01G 4/38 |
| | | | 361/274.3 |

* cited by examiner

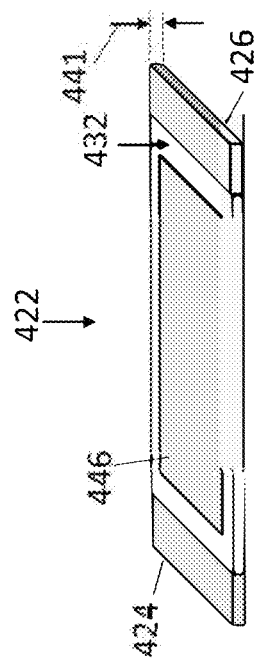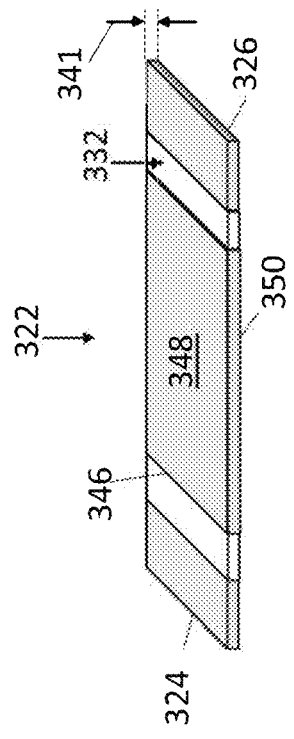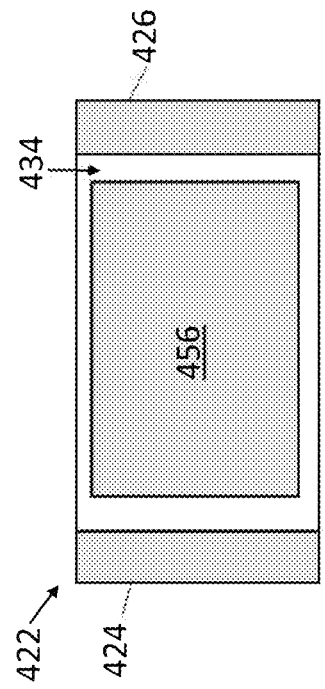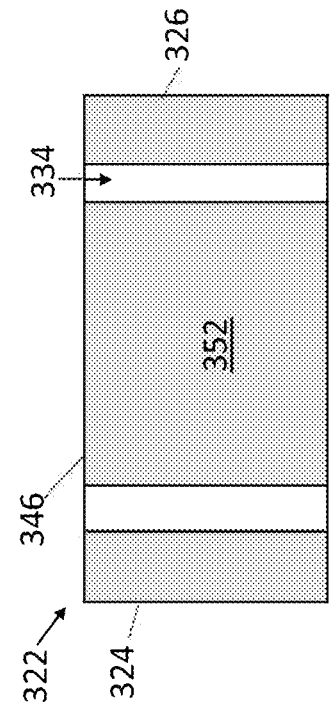

COMPONENT ARRAY INCLUDING ONE OR MORE HEAT SINK LAYERS

CROSS REFERENCE TO RELATED APPLICATION

The present application is a continuation of U.S. application Ser. No. 17/228,810, having a filing date of Apr. 13, 2021, which claims filing benefit of U.S. Provisional Patent Application Ser. No. 63/009,579 having a filing date of Apr. 14, 2020, which are incorporated herein by reference in their entirety.

BACKGROUND OF THE INVENTION

Electrical component arrays, such as stacked arrangements of capacitors, generate heat during normal operation. Heat accumulation may undesirably increase the temperature of the array. If this heat is not sufficiently dissipated, the electrical component array may overheat, resulting in damage and/or failure. As such, an electrical component array having a configuration providing improved heat dissipation would be welcomed in the art.

SUMMARY OF THE INVENTION

In accordance with one embodiment of the present invention, a component array can include a first multilayer ceramic component having a first terminal at a first end and a second terminal at a second end opposite the first end in a first direction. The component array can include a second multilayer ceramic component spaced apart from the first multilayer ceramic component in a second direction that is perpendicular to the first direction. The second multilayer ceramic component can have a first terminal at a first end and a second terminal at a second end opposite the first end in the first direction. The component array can include a heat sink layer arranged between the first multilayer ceramic component and the second component in the second direction. A first metallization layer can be formed on the heat sink layer. The first metallization layer can electrically connect the first terminal of the first multilayer ceramic component with the first terminal of the second multilayer ceramic component. A second metallization layer can be formed on the heat sink layer. The second metallization layer can electrically connect the second terminal of the first multilayer ceramic component with the second terminal of the second multilayer ceramic component.

In accordance with another embodiment of the present invention, a method of manufacturing a component array can include obtaining a first multilayer ceramic component having a first terminal at a first end and a second terminal at a second end opposite the first end in a first direction; obtaining a second multilayer ceramic component spaced apart from the first multilayer ceramic component in a second direction that is perpendicular to the first direction, the second multilayer ceramic component having a first terminal at a first end and a second terminal at a second end opposite the first end in the first direction; and arranging a heat sink layer between the first multilayer ceramic component and the second component in the second direction such that a first metallization layer of the heat sink layer electrically connects the first terminal of the first multilayer ceramic component with the first terminal of the second multilayer ceramic component, and such that a second metallization layer of the heat sink layer electrically connects the second terminal of the first multilayer ceramic component with the second terminal of the second multilayer ceramic component.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which:

FIG. 3A illustrates a perspective view of an example embodiment of a heat sink layer that includes a third metallization layer according to aspects of the present disclosure;

FIG. 3B illustrates a bottom view of the example embodiment of the heat sink layer of FIG. 3A;

FIG. 4A illustrates a perspective view of an example embodiment of a heat sink layer that includes a third metallization layer formed on a top planar surface of the heat sink layer and a fourth metallization layer formed on a bottom planar surface of the heat sink according to aspects of the present disclosure;

FIG. 4B illustrates a bottom view of the example embodiment of the heat sink layer of FIG. 4A according to aspects of the present disclosure;

Figure 1A:
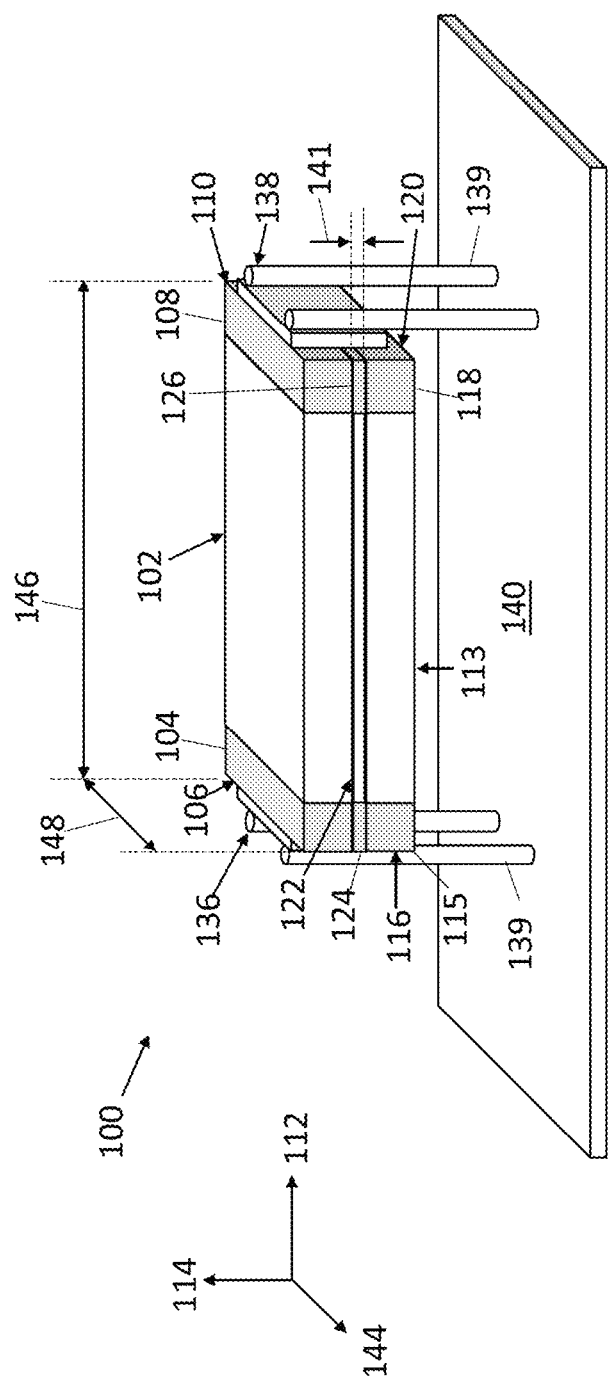
FIG. 1A illustrates a perspective view of an example embodiment of a component array in which components of the array are stacked vertically in accordance with aspects of the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrical component array including one or more heat sink layers. The component array can include a stacked configuration of multilayer ceramic components, which can include external terminals (e.g., at respective ends of the components). The heat sink layers can be arranged between respective pairs of the multilayer ceramic components, for example in an alternating configuration. The heat sink layers can selectively connect the external terminals of the components. The heat sink layer can draw heat from the multilayer ceramic components. The heat can flow through the heat sink layer to the edges of the array such that the heat can be removed from the array by conduction. Heat can then dissipate from the electrical component array to the ambient environment through convection to reduce the temperature of the electrical component array.

Such heat dissipation can improve the power capacity of the array. For example, the array can have a greater power capacity than a conventional stacked capacitor array of the same footprint (e.g., corresponding with a case size of the array). An area power capacity of the array can be defined as the power capacity of the array (e.g., in watts) divided by a footprint of the array (e.g., in square millimeters). Thus, an array according to the present disclosure can provide greater power handling capacity without requiring additional surface area (or real estate) on a mounting surface, such as a printed circuit board.

As examples, in some embodiments the array can have a power capacity of greater than about 0.1 W, in some embodiments greater than about 0.1 W, in some embodiments greater than about 0.5 W, in some embodiments greater than about 1 W, in some embodiments greater than about 5 W, and in some embodiments greater than about 10 W.

A volume power capacity of the array can be defined as the power capacity of the array (e.g., in watts) divided by a volume of the array (e.g., in cubic millimeters). Inclusion of heat sink layers as described herein can increase the volume power capacity of the array by facilitating heat flow out of and away from the components to be dissipated from the array.

As example, in some embodiments, the array can have a power capacity of greater than about 0.02 W/mm$^2$, in some embodiments greater than about 0.05 W/mm$^2$, in some embodiments greater than about 0.1 W/mm$^2$, and in some embodiments greater than about 0.5 W/mm$^2$.

The array can be formed in a variety of sizes. As examples the array can have a length that ranges from about 0.04 mm to about 5 mm or greater, in some embodiments from about 0.1 mm to about 4 mm, in some embodiments from about 0.2 mm to about 3 mm, and in some embodiments from about 0.5 mm to about 2 mm. The array can have a width that ranges from about 0.02 mm to about 5 mm or greater, in some embodiments from about 0.05 mm to about 4 mm, in some embodiments from about 0.1 mm to about 3 mm, and in some embodiments from about 0.3 mm to about 2 mm. As examples, the array can have an EIA case size (in thousands of the inches) that ranges from 0303 to 2010, in some embodiments from 0402 to 1515.

In some embodiments, each component of the array can be or include a multilayer ceramic capacitor such that the capacitors are arranged in parallel. The array can be used in applications where a high capacitance is desired. For example, the array can exhibit capacitance values of 0.1 µF or more, in some embodiments about 1 µF or more, in some embodiments 10 µF or more, and in some embodiments 1000 µF or more.

However, in other embodiments, relatively low capacitance values can be achieved, such as less than 0.1 µF, in some embodiments less than 500 nF, in some embodiments less than 100 nF, in some embodiments less than 10 nF, and in some embodiments less than 1 nF.

The array can include a variety of types of electrical components. In some embodiments, the array can include multiple capacitors without other types of electrical components. In other embodiments, the array can include a combination of various different types of components, such as a multilayer capacitor, a multilayer varistor, a multilayer capacitor, and a resistor (e.g., a thin film resistor). As examples, the array can include a heat sink layer between two multilayer varistors; the array can include a heat sink layer between two multilayer resistors; and the array can include a heat sink layer between a multilayer varistor and a multilayer capacitor. One or ordinary skill in the art will understand that various other combinations are possible within the scope of the present disclosure.

The array can include a range of multilayer ceramic components. For example, in some embodiments, the array can include two multilayer ceramic components with a heat sink layer arranged between the multilayer ceramic components. In other embodiments, the array can include 3 or more multilayer ceramic components, in some embodiments 4 or more, in some embodiments 5 or more, in some embodiments 6 or more, in some embodiments 10 or more, in some embodiments 20 or more, and in some embodiments 50 or more multilayer ceramic components. Heat sink layers can be arranged between each respective pair of multilayer ceramic components or between selective pairs of multilayer ceramic components.

In other embodiments, the array can include a heat sink layer arranged between two components, one or more of which be a component other than multilayer ceramic components. For instance, the heat sink layer can be arranged between a monolithic microwave integrated circuit (MMIC) and one or more of a multilayer ceramic component, a diode, a substrate, a GaN based component, a field-programmable gate array, integrated circuit component, or other suitable component. In other embodiments, the heat sink layer can be arranged between any suitable combination of components or devices described above and herein.

A first multilayer ceramic component can have a first terminal at a first end and a second terminal at a second end that is opposite the first end in a first direction. A second multilayer ceramic component can be spaced apart from the first multilayer ceramic component in a second direction that is perpendicular to the first direction. The second multilayer ceramic component can have a first terminal at a first end and a second terminal at a second end that is opposite the first end in the first direction. A heat sink layer can be arranged between the first multilayer ceramic component and the second component in the second direction. A first metallization layer can be formed on the heat sink layer and can electrically connect the first terminal of the first multilayer ceramic component with the first terminal of the second multilayer ceramic component. A second metallization layer can be formed on the heat sink layer and can electrically connect the second terminal of the first multilayer ceramic component with the second terminal of the second multilayer ceramic component. Thus, the heat sink layer can electrically connect the first and second multilayer ceramic components to form the array.

In some embodiments, the heat sink layer can include one or more additional metallization layers. For example, a third metallization layer that is electrically isolated from each of the first and second metallization can be formed of the heat sink layer. The third metallization layer can contact one or both of the first and second electrical components. The third metallization layer can improve heat conduction from the electrical components into the heat sink layer to improve heat dissipation away from the electrical components.

The heat sink layer can have a range of dimensions. For example, the heat sink layer can have a thickness in the second direction that ranges from about 0.01 mm to about 50 mm, in some embodiments from about 0.1 mm to about 5 mm, in some embodiments from about 0.2 mm to about 4 mm, in some embodiments from about 0.3 mm to about 3 mm, and in some embodiments from about 0.4 mm to about 1.5 mm.

The heat sink layer(s) can include a material that is thermally conductive and electrically resistive. The heat sink layer can include a material having a thermal conductivity between about 100 W/m·° C. and about 300 W/m·° C. at about 22° C., in some embodiments between about 125 W/m·° C. and about 250 W/m·° C. at about 22° C., in some embodiments between about 150 W/m·° C. and about 200 W/m·° C. at about 22° C. As examples, the heat sink layer can include aluminum nitride, beryllium oxide, aluminum oxide, boron nitride, silicon nitride, magnesium oxide, zinc oxide, silicon carbide, any suitable ceramic material, and mixtures thereof.

As is known in the art, thermal resistivity and thermal conductivity of a material are inversely related. Thus, a low thermal resistivity correlates with a high thermal conductivity. In some embodiments, the heat sink layer may be made from any suitable material having a generally low thermal resistivity (e.g., less than about $6.67 \times 10^{-3}$ m·° C./W), and a generally high electrical resistivity (e.g., greater than about $10^{14}$ Ω·cm). A thermal resistivity of $6.67 \times 10^{-3}$ m·° C./W is equivalent with a thermal conductivity of about 150 W/m·° C. In other words, suitable materials for the heat sink layer may have a generally high thermal conductivity, such as greater than about 150 W/m·° C.

For example, in some embodiments, the heat sink layer may be made from a material having a thermal conductivity between about 100 W/m·° C. and about 300 W/m·° C. at about 22° C. In other embodiments, the heat sink layer may be made from a material having a thermal conductivity between about 125 W/m·° C. and about 250 W/m·° C. at about 22° C. In other embodiments, the heat sink layer may be made from a material having a thermal conductivity between about 150 W/m·° C. and about 200 W/m·° C. at about 22° C.

As example, the heat sink layer may comprise aluminum nitride, beryllium oxide, aluminum oxide, boron nitride, silicon nitride, magnesium oxide, zinc oxide, silicon carbide, any suitable ceramic material, and mixtures thereof. Any suitable material that is electrically resistive and thermally conductive may be used, however.

For example, in some embodiments, the heat sink layer may be made primarily from aluminum nitride. The heat sink layer may contain additives or impurities. In other embodiments, the heat sink layer includes beryllium oxide. For example, in some embodiments the heat sink layer may be made from any suitable composition including beryllium oxide. In some embodiments, the heat sink layer may be made primarily from beryllium oxide.

In some embodiments, the terminals may include an outer layer over an inner layer. The inner layer may be magnetic in some embodiments, and non-magnetic in other embodiments. The outer layer may be formed from any suitable material, including, for example, corrosion-resistant materials. For example, in some embodiments, the terminals may comprise an outer layer of gold, silver, platinum, nickel, and/or a mixture or compound thereof. For example, in one embodiment, one or more of the terminals may include an outer layer of gold disposed over a magnetic substrate, such as a magnetic or magnetized metal. In some embodiments, the substrate may include a metal such as copper or steel. In another embodiment, one of more of the terminals may include an outer layer, such as gold, disposed over a non-magnetic substrate, such as a ceramic, for example. In other embodiments, the outer layer may be gold, silver, platinum, nickel, copper, steel, and/or any other suitable material. Similarly, in other embodiments, the substrate may be gold, silver, platinum, nickel, copper, steel, and/or any other suitable material. Moreover, in some embodiments, the terminals may not include an outer layer (e.g., may include a single layer).

The array may be manufactured or fabricated using any suitable technique. For example, the heat sink layer(s) can be deposited on the multilayer capacitors or other ceramic components. Various physical and/or chemical deposition processes can be employed. Additionally or alternatively, the ceramic components can be dipped to form the heat sink layer(s) as a film (e.g., a thin film and/or thick film).

The terminals of the components and/or metallization layers of the heat sink may be formed using any suitable process, including, for example, chemical or vapor deposition on the heat sink layer and/or components. Alternatively, in some embodiments, the terminals may be formed by dipping portions of the components and/or heat sink layer(s) in a liquid form of the terminal material and then allowing the terminal material to harden. The terminals may then be additionally shaped or finished using any suitable method, including for example, grinding or sanding. In some embodiments, the above process may be repeated to produce terminals having multiple layers, e.g., a gold plating over a magnetic or non-magnetic layer.

The components and/or heat sink layer(s) (if formed separate from the component(s)) can be stacked together to form the array. The terminals of the components and/or heat sink layer(s) can be joined together using solder and/or heat to melt and fuse the terminals.

Lead frames can be coupled to the terminals of the components and/or heat sink layer(s). Alternatively, one or more additional layers can be formed over the terminals and/or metallization layers. For example, the component can be configured for surface mounting using soldering, brazing, or the like.

In some embodiments, a length of the first component and/or array (e.g., between first terminals and the second terminals) can be greater than a width of the first component and/or a width of the array. However, in some embodiments, a length of the components and/or array in the first direction can be greater than a width of the components and/or array in the third direction. This configuration can be referred to as a "reverse geometry" configuration. For example, a ratio of the length to the width of the array may be less than 1, in some embodiments less than about 0.8, in some embodiments less than about 0.7, in some embodiments less than about 0.6, and in some embodiments less than about 0.5.

I. Example Embodiments

Figure 1B:
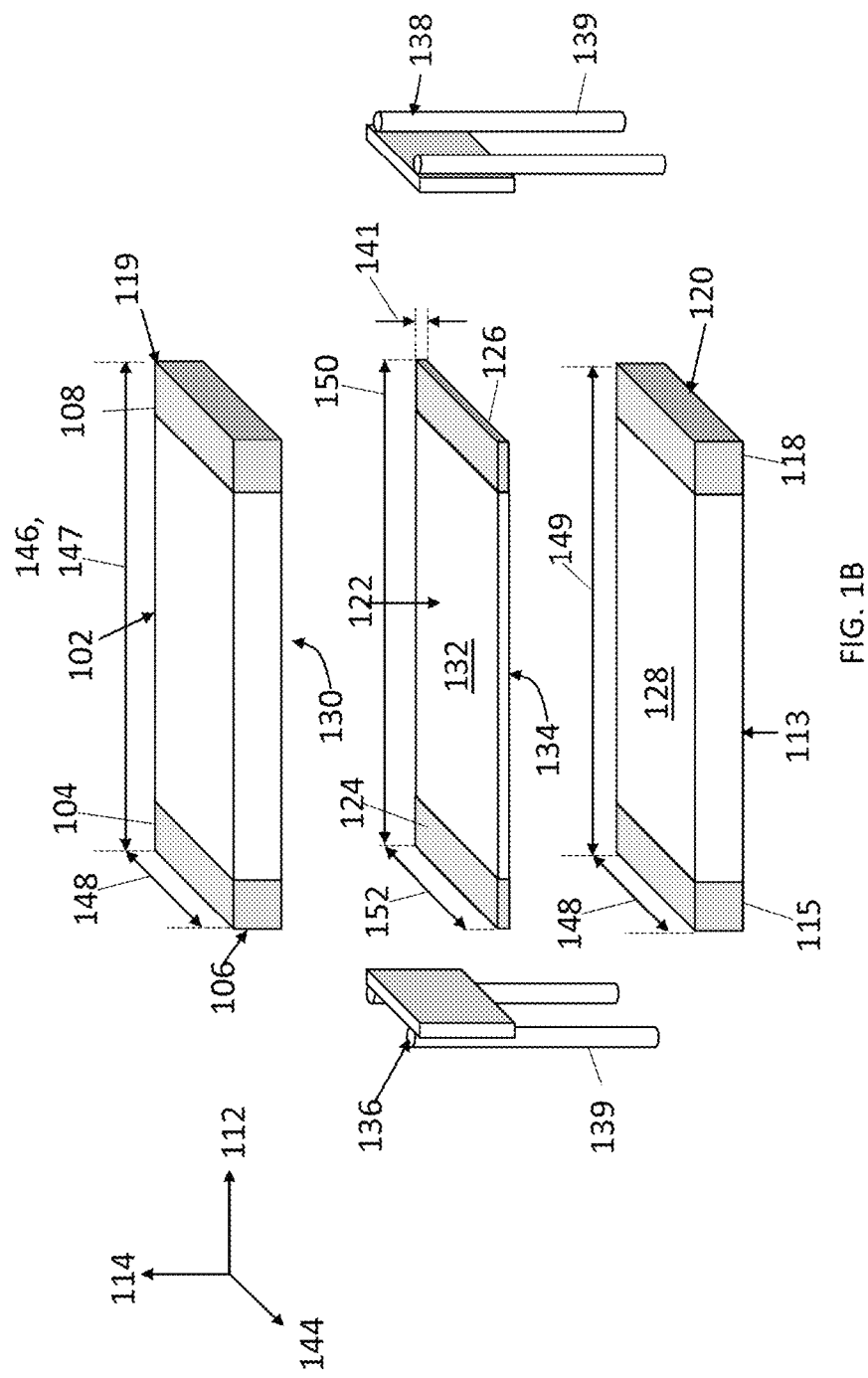
FIG. 1B illustrates an exploded perspective view of the component array of FIG. 1A.

FIGS. 1A and 1B illustrate a perspective view and an exploded perspective view, respectively, of an example embodiment of a component array 100. The component array 100 can include a first multilayer ceramic component 102 having a first terminal 104 at a first end 106 and a second terminal 108 at a second end 110 opposite the first end 106 in a first direction 112. The component array 100 can generally have a monolithic, rectangular prism configuration.

A second multilayer ceramic component 113 can be spaced apart from the first multilayer ceramic component 102 in a second direction 114 that is perpendicular to the first direction 112. The second multilayer ceramic component 113 can have a first terminal 115 at a first end 116 and a second terminal 118 at a second end 120 that is opposite the first end 116 in the first direction 112.

A heat sink layer 122 can be arranged between the first multilayer ceramic component 102 and the second component in 112 the second direction 114. For example, the components 102, 113 and heat sink layer 122 can be stacked together to form the array 100.

The heat sink layer 122 can include one or more metallization layers. The metallization layers can improve heat conduction and/or selectively electrically connect various terminals of the components 102, 113. For example, the heat sink layer 122 can include a first metallization layer 124 formed on the heat sink layer 122. The first metallization layer 124 can electrically connect the first terminal 104 of the first multilayer ceramic component 102 with the first terminal 115 of the second multilayer ceramic component 113. A second metallization layer 126 can be formed on the heat sink layer 122 and electrically connecting the second terminal 108 of the first multilayer ceramic component 102 with the second terminal 118 of the second multilayer ceramic component 113.

The metallization layers 124, 126 can facilitate heat conduction out of the first multilayer ceramic component 102 and the second multilayer ceramic component 114. As indicated above, the heat sink layer 122 can include a material having a thermal conductivity from about 150 W/m·° C. to about 300 W/m·° C. at about 22° C. As examples, the heat sink layer 122 can include aluminum nitride or beryllium oxide.

The heat sink layer 122 can generally be arranged between the first multilayer ceramic component 102 and the second multilayer ceramic component 113. For example, the second multilayer ceramic component 113 can include a top planar surface 128 (FIG. 1B). The first multilayer ceramic component 102 can include a bottom planar surface 130 (FIG. 1B). The heat sink layer 122 can be arranged between and/or contact each of the top planar surface 128 of the second multilayer ceramic component 113 and the bottom planar surface 130 of the first multilayer ceramic component 102. The heat sink layer 122 can include a top planar surface 132 and a bottom planar surface 134. The top planar surface 132 of the heat sink layer 122 can be arranged opposite the bottom planar 130 surface of the first multilayer ceramic component 102. For example, the top planar surface 132 of the heat sink layer 122 can directly contact the bottom planar 130 surface of the first multilayer ceramic component 102. The bottom planar surface 134 of the heat sink layer 122 can be arranged opposite the top planar surface 128 of the second multilayer ceramic component 113. For example, the bottom planar surface 134 of the heat sink layer 122 can directly contact the top planar surface 128 of the second multilayer ceramic component 113. Thus, the heat sink layer 122 can be sandwiched between the ceramic components 102, 113.

One or more of the metallization layers 124, 126 can wrap around the heat sink layer such that one or more of the metallization layers 124, 126 are formed on each of the top planar surface 132 of the heat sink layer 122 and the bottom planar surface 134 of the heat sink layer 122. Such a wrap around configuration can facilitate electrical connection between the first terminal 104 of the first multilayer ceramic component 102 and the first terminal 115 of the second multilayer ceramic component 113 and/or between the second terminal 108 of the first multilayer ceramic component 102 and the second terminal 118 of the second multilayer ceramic component 113.

The component array 100 can include one or more lead frames 136, 138. A first lead frame 136 can be electrically coupled with (e.g., affixed to) the first terminal 104 of the first multilayer ceramic component 102, the first terminal 115 of the second multilayer ceramic component 113, and/or the first metallization layer 124 formed on the heat sink layer 122. A second lead frame 138 can be electrically coupled with (e.g., affixed to) the second terminal 108 of the second multilayer ceramic component 113, the second terminal 118 of the second multilayer ceramic component 113, and/or the second metallization layer 126 formed on the heat sink layer 122.

The heat sink layer 122 can have a thickness 141 in the second direction 114. For example, in some embodiments, the thickness 141 can range from about 0.1 mm to about 5 mm.

The component array 100 can be configured for mounting in a variety of configurations. For example, the component array 100 can be configured for mounting such that the planar surfaces 128, 130, 132, 134 of the components 102, 113 and/or heat sink layer 122 are arranged parallel to a mounting surface 140. For example, one or more of the lead frames 136, 138 can include one or more leads 139 that extends in the second direction 114 for mounting the array 100 to the mounting surface 140 such that the second direction 114 is perpendicular to the mounting surface 140. The leads 139 can have a variety of configurations such as through-hole leads, J-style leads, L-style leads, or any other suitable lead configurations.

In some embodiments, the electrical components 102, 113 and heat sink layer 122 of the component array 100 can generally have the same dimensions in the first direction 112 and third direction 113, such that the component array 100 has a generally monolithic and/or rectangular prism configuration. For example, the first component 102 can have a length 146 in the first direction 112 and a width 148 in the third direction 144. The heat sink layer 122 and second component 113 can generally have the same length 146 and width 148 as the first component 102. Referring to FIG. 1B, the heat sink layer 122 can have a length 150 in the first direction 112 and a width 152 in the third direction 144. The length 150 of the heat stink layer 122 can be approximately equal to the length 146 of the first component 102. The width 152 of the heat sink layer 122 can be approximately equal to the width 148 of the first component 102.

In some embodiments, the electrical components 102, 113 and heat sink layer 122 of the component array 100 can generally have the same dimensions in the first direction 112 and third direction 144, such that the component array 100 has a monolithic, rectangular prism configuration. More specifically, the length 146 of the component array 100 can generally correspond to the larger of a length of the first component 102 and a length of the second component 113 in the first direction 112. A length 147 of the first component 102 can be approximately equal to a length 149 of the second component 113, and thus equal to the length 146 of the component array 100.

In other embodiments, however, the length 150 of the heat sink layer 122 can be greater than or less than the length 146 of the first component 102. For example, the length 150 of the heat sink layer 122 can be greater than one or both of the length(s) 147, 149 of the components 102, 113 such that the heat sink layer 122 extends away from the first component 102 and/or second component 113 in the first direction 112.

Similarly, the width 152 of the heat sink layer 122 can be greater than or less than the width 148 of the first component 102. For example, the width 152 of the heat sink layer 122 can be greater than the width 148 of the first component 102 such that the heat sink layer 122 extends outward in the third direction 144 from the first component 102. For example, portions of the heat sink layer 122 that extend outward in the third direction 144 from the first component 102 can increase thermal convection between the heat sink layer 122 and an ambient environment. Such portions of the heat sink layer 122 can act as thermal fins.

Figure 2A:
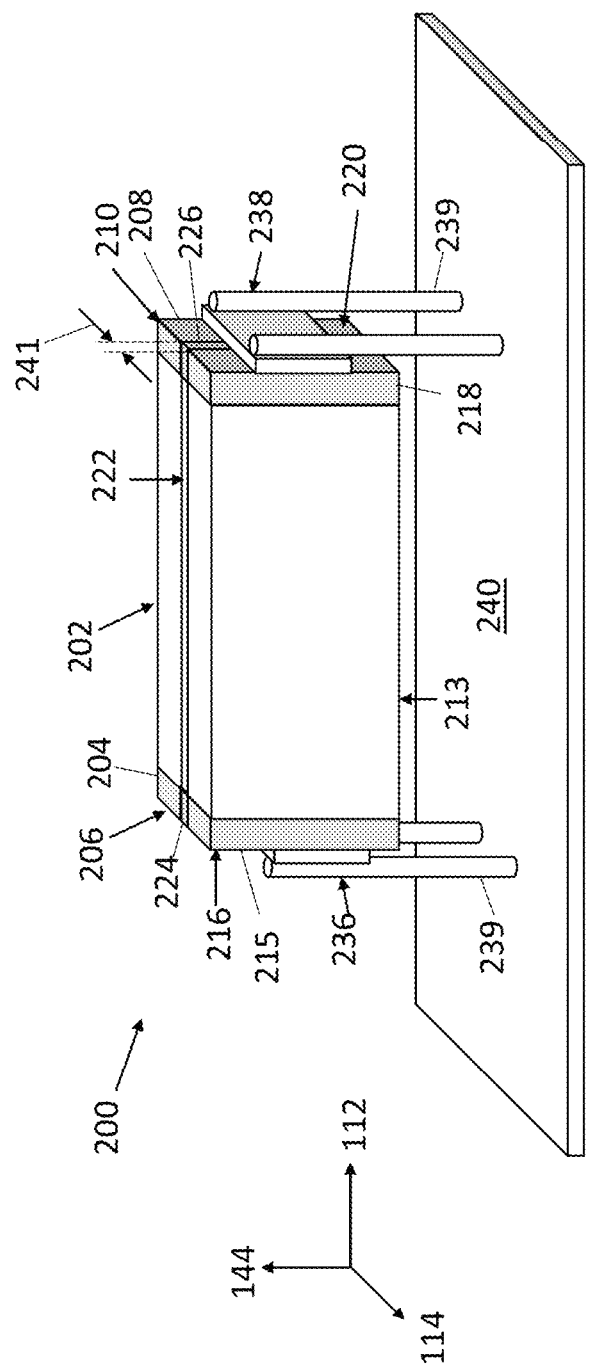
FIG. 2A illustrates a perspective view of another embodiment of a component array in which components of the array are stacked horizontally in accordance with aspects of the present invention.
Figure 2B:
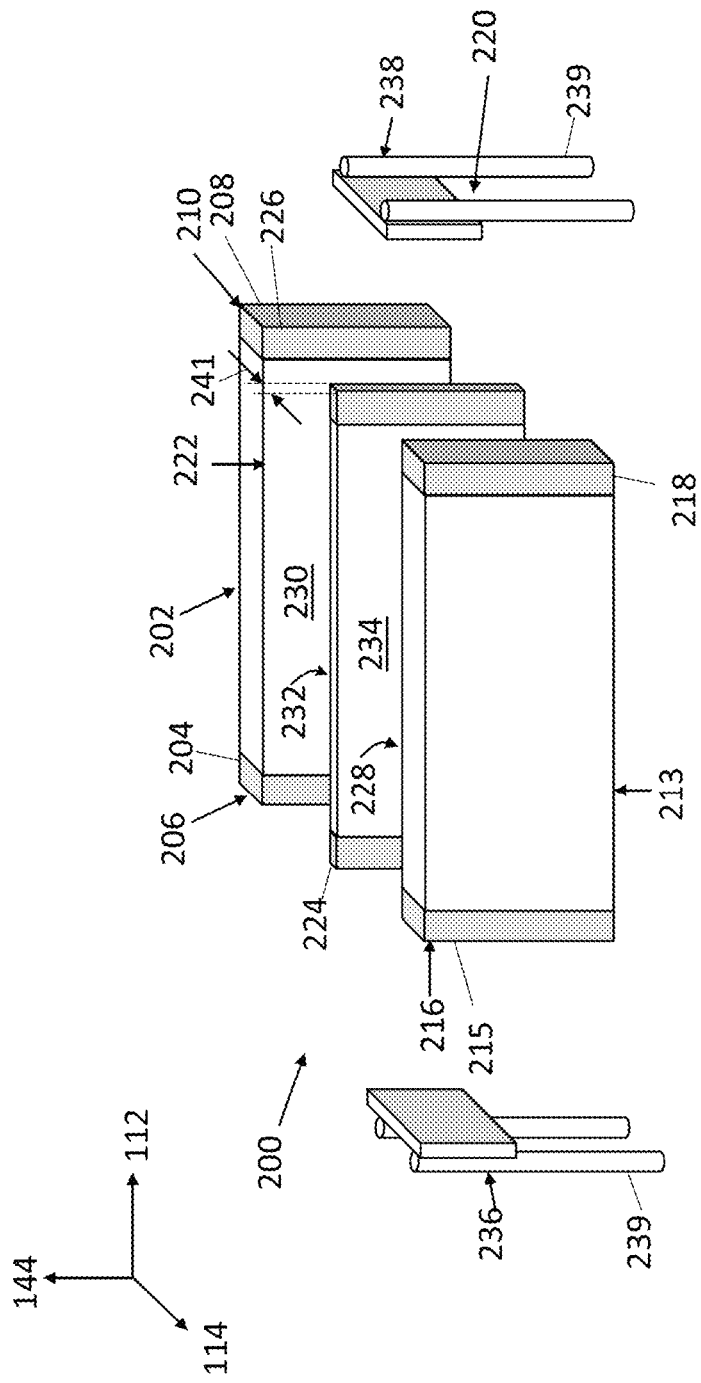
FIG. 2B illustrates an exploded perspective view of the component array of FIG. 2A.

Referring to FIGS. 2A and 2B, in other embodiments, a component array 200 can be configured for mounting such that one or more planar surfaces 228, 230, 232, 234 of components 202, 213 and/or a heat sink layer 222 are arranged parallel to a mounting surface 240. Reference numerals in FIGS. 2A and 2B generally correspond to features and elements of FIG. 1. The lead frames 136, 138 can include one or more leads 139 that extends in a third direction 144 that is perpendicular to each of the first direction 112 and the second direction 114.

In some embodiments, the heat sink layer 322 can include one or more additional metallization layers, which can improve head conduction from the components to the heat sink layer(s). For example, FIGS. 3A and 3B illustrate a perspective view and a bottom view, respectively, of an example embodiment of a heat sink layer 322 that includes a third metallization layer 346 according to aspects of the present disclosure. A third metallization layer 346 can be formed on at least one of a top planar surface 332 of the heat sink layer 322 or a bottom planar surface 334 of the heat sink layer 322. The third metallization layer 346 can be electrically isolated from each of a first metallization layer 324 and a second metallization layer 326. The third metallization layer 346 can include a first portion 348 formed on the top planar surface 332 of the heat sink layer 322, a second portion 350 formed on the bottom planar surface 334 of the heat sink 322, and a third portion 352 connecting the first portion 348 and the second portion 350.

FIGS. 4A and 4B illustrate a perspective view and a bottom view, respectively, of an example embodiment of a heat sink layer 422 that includes a third metallization layer 446 formed on the top planar surface 432 of the heat sink layer 432 and a fourth metallization layer 456 formed on the bottom planar surface 434 of the heat sink 422. The third metallization layer 446 can be electrically isolated from each of the first metallization layer 424 and the second metallization layer 426.

Figure 5:
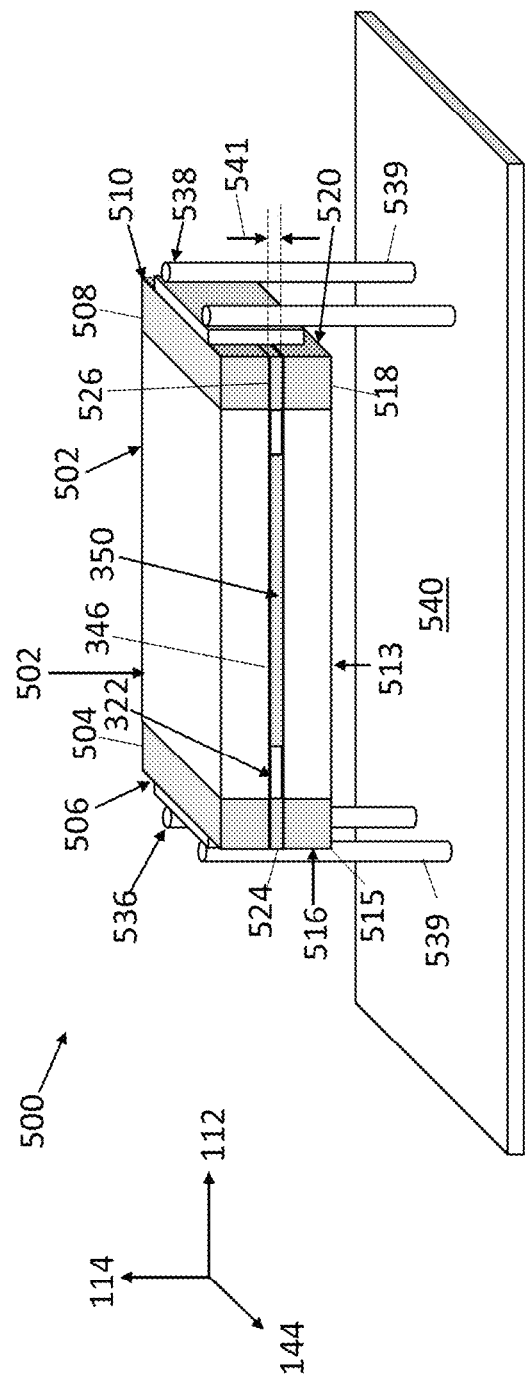
FIG. 5 illustrates a perspective view of another embodiment of a component array that includes the heat sink layer of FIG. 3B according to aspects of the present disclosure.

FIG. 5 illustrates a perspective view of another embodiment of a component array 500 that can include the heat sink layer 322 of FIG. 3B arranged between a first component 502 and a second component 513. The first portion 348 (FIG. 3A) of the third metallization layer 346 can contact the first component 502. The second portion 352 (FIG. 3B) of the third metallization layer 346 can contact the second component 513. As shown in FIG. 5, the second portion 350 of the third metallization layer 346 can be exposed along an exterior of the component array 500.

Figure 6:
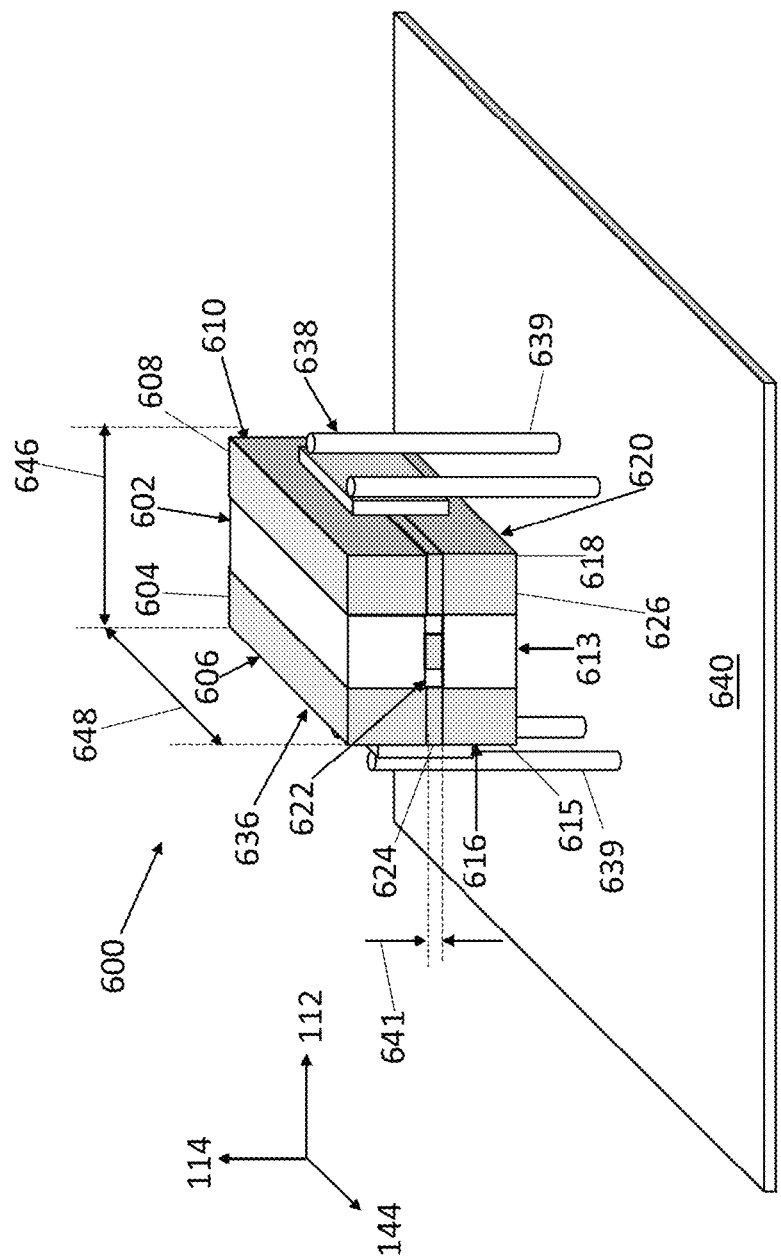
FIG. 6 illustrates a perspective view of another embodiment of a component in which a length of the array is less than a width of the array according to aspects of the present disclosure.

In some embodiments, the length 146 of the first component 102 and/or array 100 (e.g., between first terminals 104, 115 and the second terminals 108, 118) can be greater than the width 148 of the first component 102 and/or array 100, for example as illustrated in FIGS. 1A through 5. However, referring to FIG. 6, in some embodiments, a length 646 of the components 602, 613 and/or array 600 in the first direction 112 can be greater than a width 648 of the components 602, 613 and/or array 600 in the third direction 144 (e.g., as a "reverse geometry" component). For example, a ratio of the length 646 to the width 648 may be less than 1, in some embodiments less than about 0.8, in some embodiments less than about 0.7, in some embodiments less than about 0.6, and in some embodiments less than about 0.5.

II. Applications

In some embodiments, the array can be configured as a stacked capacitor array. Each component of the array can be or include a multilayer ceramic capacitor such that the capacitors are arranged in parallel. In other embodiments, the array can include a mixture of components (e.g., capacitors, varistors, resistors, etc.).

The array may be employed in a wide variety of applications. Examples include digital circuits, hybrid circuits, and analog circuits. For instance, the array can be employed in laser optics drivers, gallium-nitride-based devices, monolithic microwave integrated circuits, other integrated circuits, high speed digital serializer and/or de-serializer integrated circuits, field-programmable gate arrays, and/or direct-to-radiofrequency conversion devices. As additional examples, the array can be included in power conversion circuits (e.g., input and/or output filters in DC/DC converters), power supplies (e.g., switch mode power supplies, telecommunication network circuits and/or devices, motor drive filters, and hybrid power applications. Other suitable applications may include, for instance, waveguides, RF applications (e.g., delay lines), antenna structures, matching networks, resonant circuits, and other applications. Further, the array can be used in a variety of aerospace applications. As one example, the array can be employed in circuits and/or devices in missiles (e.g., hypersonic missiles), aerospace instrumentation panels, or the like.

The array can provide a variety of benefits, including increased power capacity as described herein. Further in some embodiments and/or applications, the array can reduce radiation emission (e.g., alpha particles, beta particles, etc.).

Figure 7:
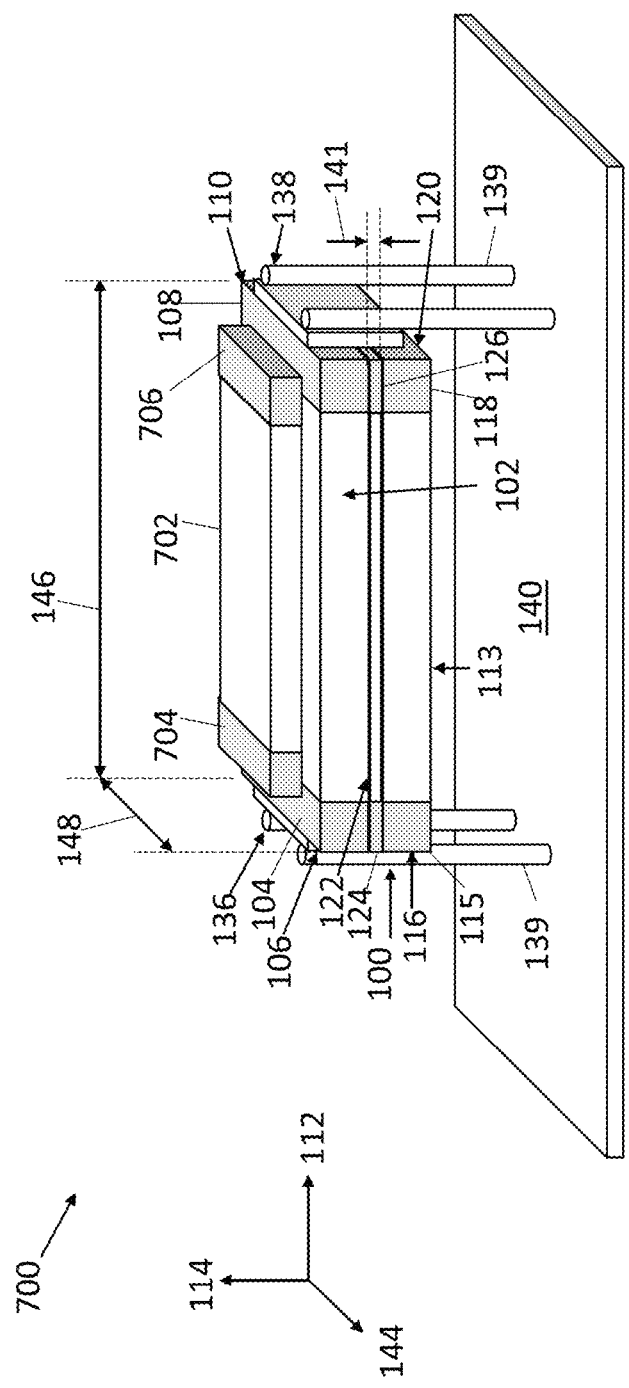
FIG. 7 illustrates an example application configuration including a separate component may mounted on top of the component array of FIGS. 1A and 1B.

Referring to FIG. 7, in one example application configuration 700, a separate component 702 may be mounted on top of the component array 100, for example as described above with reference to FIGS. 1A and 1B. The component array 100 can act as both a heat sink and capacitive energy source. For example, the component 702 can have a first terminal 704 connected with the first terminal 104 of the first multilayer ceramic component 102 and a second terminal 706 connected with the second terminal 126 of the first multilayer ceramic component 102 and a second terminal 706. Thus, in this example application configuration 700, the separate component 702 can be electrically connected in parallel with the component array 100. However, other configurations are possible. For instance, the separate component 702 can be electrically connected in series with the component array 100. The separate component 702 can include additional terminals and/or be connected with components in addition to the component array 100.

Example separate components 702 include transistors, diodes, resistors, varistors, other passive devices, electronic circuits, or components thereof. As one example, the separate component 702 can be or include a Gallium Nitride (GaN) transistor, such as a high mobility transistor (HEMT).

III. Test Methods

A capacitance of the array may be measured according to MIL-STD-202 Method 305, using a Keithley 3330 Precision LCZ meter with a DC bias of 0.0 volts, 1.1 volts, or 2.1 volts (1 volt root-mean-squared sinusoidal signal). The operating frequency is 1 KHz, and the temperature is about 25° C. The relative humidity may be 25% or 85%.

Power Capacity

The power capacity of the array can be defined as a power level that produces a steady state temperature of about 85° C. The power capacity can be measured using a Keithley 2400 series Source Measure Unit (SMU), for example, a Keithley 2410-C SMU.

The array may be subjected to a sinusoidal input signal at a variety of frequencies and amplitudes. The array may initially be at a typical room temperature (24.8° C.). The sinusoidal input signal may be applied at a test frequency. An amplitude of the sinusoidal input signal can be iteratively increased until the array reaches a steady temperate of about 85° C.

More specifically, the array can be subjected to a steady state power level (e.g., about 300 MHz sinusoidal signal with a root-mean-square power of 1 W) until the filter assembly reached a steady state temperature. The power level can then be increased by a fixed step amount (e.g., 1 W) and maintained at the new higher power level (e.g., about 300 MHz sinusoidal signal with a root-mean-square power of 2 W, 3 W, 4 W, etc.). This process can be repeated until the steady state temperature of the array is about 85° C. The applied power at that point can be measured as the power capacity of the array. The above procedure may be repeated using a variety of frequencies to establish the power capacity of the array across a range of frequencies, if desired.

An area power capacity of the array can be calculated by dividing the measured power capacity of the array by an area or footprint of the array. A volume power capacity of the array can be calculated by dividing the measured power capacity of the array by a volume of the array.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A component array comprising:
   a first multilayer ceramic component having a first terminal at a first end and a second terminal at a second end opposite the first end in a first direction;
   a second multilayer ceramic component spaced apart from the first multilayer ceramic component in a second direction that is perpendicular to the first direction, the second multilayer ceramic component having a first terminal at a first end and a second terminal at a second end opposite the first end in the first direction;
   a heat sink layer arranged between the first multilayer ceramic component and the second multilayer ceramic component in the second direction;
   a first metallization layer formed on the heat sink layer and electrically connecting the first terminal of the first multilayer ceramic component with the first terminal of the second multilayer ceramic component; and
   a second metallization layer formed on the heat sink layer and electrically connecting the second terminal of the first multilayer ceramic component with the second terminal of the second multilayer ceramic component, wherein the component array has a power capacity greater than about 0.1 W.

2. The component array of claim 1, wherein the heat sink layer comprises a material having a thermal conductivity from about 150 W/m·° C. to about 300 W/m·° C. at about 22° C.

3. The component array of claim 1, wherein the heat sink layer comprises aluminum nitride.

4. The component array of claim 1, wherein the heat sink layer comprises beryllium oxide.

5. The component array of claim 1, wherein the second multilayer ceramic component comprises a top planar surface, and the first multilayer ceramic component comprises a bottom planar surface, wherein the heat sink layer is arranged between the top planar surface of the second multilayer ceramic component and the bottom planar surface of the first multilayer ceramic component.

6. The component array of claim 5, wherein the heat sink layer comprises a top planar surface and a bottom planar surface, and wherein the top planar surface of the heat sink layer is opposite the bottom planar surface of the first multilayer ceramic component, and the bottom planar surface of the heat sink layer is opposite the top planar surface of the second multilayer ceramic component.

7. The component array of claim 6, wherein the first metallization layer is formed on each of the top planar surface of the heat sink layer and the bottom planar surface of the heat sink layer.

8. The component array of claim 6, wherein the heat sink layer comprises a third metallization formed on at least one of the top planar surface of the heat sink layer or the bottom planar surface of the heat sink layer, the third metallization electrically isolated from each of the first metallization layer and the second metallization layer.

9. The component array of claim 6, wherein the heat sink layer comprises a third metallization layer formed on the top planar surface of the heat sink layer and a fourth metallization layer formed on the bottom planar surface of the heat sink, the third metallization layer electrically isolated from each of the first metallization layer and the second metallization layer.

10. The component array of claim 6, wherein the heat sink layer comprises a third metallization layer electrically isolated from each of the first metallization layer and the second metallization layer, the third metallization layer comprising a first portion formed on the top planar surface of the heat sink layer, a second portion formed on the bottom planar surface of the heat sink, and a third portion connecting the first portion and the third portion.

11. The component array of claim 1, wherein one or more of the first multilayer ceramic component and the second multilayer ceramic component comprises one or more of a capacitor, a varistor, and a resistor.

12. The component array of claim 1, wherein the first multilayer ceramic component comprises a first capacitor and the second multilayer ceramic component comprises a second capacitor.

13. The component array of claim 1, further comprising a lead frame electrically coupled with the first terminal of the first multilayer ceramic component, the first terminal of the second multilayer ceramic component, and the first metallization layer formed on the heat sink layer.

14. The component array of claim 13, wherein the lead frame comprises at least one lead that extends in the second direction for mounting the array to a mounting surface such that the second direction is perpendicular to the mounting surface.

15. The component array of claim 13, wherein the lead frame comprises at least one lead that extends in a third direction that is perpendicular to each of the first direction and the second direction.

16. The component array of claim 1, wherein the heat sink layer has a thickness in the second direction that ranges from about 0.1 mm to about 5 mm.

17. The component array of claim 1, the array has a length in the first direction and a width in a third direction that is perpendicular to each of the first direction and the second direction, and wherein the length of the array is greater than the width of the array.

18. The component array of claim 1, the array has a length in the first direction and a width in a third direction that is perpendicular to each of the first direction and the second direction, and wherein the width of the array is greater than the length of the array.

19. A method of manufacturing a component array, the method comprising:
   obtaining a first multilayer ceramic component having a first terminal at a first end and a second terminal at a second end opposite the first end in a first direction;
   obtaining a second multilayer ceramic component spaced apart from the first multilayer ceramic component in a second direction that is perpendicular to the first direction, the second multilayer ceramic component having a first terminal at a first end and a second terminal at a second end opposite the first end in the first direction; and
   arranging a heat sink layer between the first multilayer ceramic component and the second component in the second direction such that a first metallization layer of the heat sink layer electrically connects the first terminal of the first multilayer ceramic component with the first terminal of the second multilayer ceramic component, and such that a second metallization layer of the heat sink layer electrically connects the second terminal of the first multilayer ceramic component with the second terminal of the second multilayer ceramic component,
   wherein the component array has a power capacity greater than about 0.1 W.

20. The method of claim 19, further comprising coupling a lead frame with the first metallization layer formed on the heat sink layer.

21. The method of claim 20, further comprising coupling an additional lead frame with the second metallization layer formed on the heat sink layer.

22. The component array of claim 1, wherein the component array has a power capacity greater than about 5 W.

* * * * *